US012720384B2

(12) United States Patent
Müller

(10) Patent No.: US 12,720,384 B2
(45) **Date of Patent: *Aug. 25, 2026**

(54) HANDLING LAYER 3 MEASUREMENTS OF A USER EQUIPMENT

(71) Applicant: Telefonaktiebolaget LM Ericsson (publ), Stockholm (SE)

(72) Inventor: Walter Müller, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 257 days.

This patent is subject to a terminal disclaimer.

(21) Appl. No.: 18/281,131

(22) PCT Filed: Mar. 17, 2021

(86) PCT No.: PCT/SE2021/050231

§ 371 (c)(1),
(2) Date: Sep. 8, 2023

(87) PCT Pub. No.: WO2022/197221

PCT Pub. Date: Sep. 22, 2022

(65) Prior Publication Data

US 2024/0163753 A1 May 16, 2024

(51) Int. Cl.
*H04W 36/00* (2009.01)
*H04W 36/08* (2009.01)

(52) U.S. Cl.
CPC ... *H04W 36/0094* (2013.01); *H04W 36/0069* (2018.08); *H04W 36/087* (2023.05)

(58) Field of Classification Search
CPC ......... H04W 36/0094; H04W 36/0069; H04W 36/087; H04W 36/00692; H04W 36/00695; H04W 36/00698
See application file for complete search history.

(56) References Cited

U.S. PATENT DOCUMENTS

2019/0253966 A1* 8/2019 Park .................. H04W 52/0209
2019/0373627 A1 12/2019 Luo
2021/0112504 A1* 4/2021 Park .................. H04W 72/0453

OTHER PUBLICATIONS

International Search Report and Written Opinion of the International Searching Authority, PCT/SE2021/050230, mailed Nov. 19, 2021, 11 pages.

(Continued)

*Primary Examiner* — Ji-Hae Yea
(74) *Attorney, Agent, or Firm* — Sage Patent Group

(57) ABSTRACT

There is provided mechanisms for handling layer 3 measurements of a UE. A method is performed by an access network system. The access network system includes a CU and a DU. The method includes configuring the UE to perform layer 3 measurements. The UE is configured to perform layer 3 measurements according to measurement IDs. A first subset of the measurement IDs is associated with the CU and a second subset of the measurement IDs is associated with the DU. The method includes obtaining a report with a layer 3 measurement from the UE. The report has one of the measurement IDs. The method includes performing, at the CU, an action that depends on the layer 3 measurement in the report only when the measurement ID of the report is one of the measurement IDs in the first subset.

14 Claims, 7 Drawing Sheets

(56) References Cited

OTHER PUBLICATIONS

International Search Report and Written Opinion of the International Searching Authority, PCT/SE2021/050231, mailed Nov. 19, 2021, 10 pages.
3GPP TS 38.401 v16.4.0 (Jan. 2021); 3rd Generation Partnership Project; Technical Specification Group Radio Access Network; NG-RAN; Architecture description (Release 16), 78 pages.
3GPP TS 38.331 v16.3.1 (Jan. 2021); 3rd Generation Partnership Project; Technical Specification Group Radio Access Network; NR; Radio Resource Control (RRC) protocol specification (Release 16), 932 pages.
3GPP TS 38.331 v15.11.0 (Sep. 2020); 3rd Generation Partnership Project; Technical Specification Group Radio Access Network; NR; Radio Resource Control (RRC) protocol specification (Release 15), 541 pages.
3GPP TS 38.473 v16.4.0 (Jan. 2021); 3rd Generation Partnership Project; Technical Specification Group Radio Access Network; NG-RAN; F1 application protocol (F1AP) (Release 16), 461 pages.
Non-Final Office Action mailed Sep. 10, 2025 for U.S. Appl. No. 18/281,106, 16 pages.

* cited by examiner

HANDLING LAYER 3 MEASUREMENTS OF A USER EQUIPMENT

CROSS REFERENCE TO RELATED APPLICATIONS

This application is a 35 U.S.C. § 371 national stage application of PCT International Application No. PCT/SE2021/050231 filed on Mar. 17, 2021, the disclosure and content of which is incorporated by reference herein in its entirety.

TECHNICAL FIELD

Embodiments presented herein relate to a method, an access network system, a computer program, and a computer program product for handling layer 3 measurements of a user equipment.

BACKGROUND

In communications networks, there may be a challenge to obtain good performance and capacity for a given communications protocol, its parameters and the physical environment in which the communications network is deployed.

For example, in release 15 of the third generation partnership project (3GPP Rel-15) the concept of an access network node being split between a distributed unit (DU) and central unit (CU) was introduced. In this respect, one CU could, possibly, be operatively connected to a plurality of DUs FIG. 1 schematically illustrates a CU 200, a DU 300, and a UE 400. The CU 200 and the DU 300 are provided in an access network system 600. The CU 200 and the DU 300 communicate over the F1-AP protocol. According to the schematic illustration of FIG. 1, each of the CU 200, the DU 300, and the UE 400 comprises a respective RRC entity; a CU RRC entity 250 in the CU 200, a DU RRC entity 250 in the DU 300, and a UE RRC entity 450 in the UE 400 (where RRC is short for radio resource control). The RRC entities 250, 350, 450 are configured for handling of RRC messages. In this respect, the DU RRC entity 250 forwards RRC messages from the UE 400 to the CU 200 without considering the actual content of the RRC message.

According to some examples, the CU is a logical node that comprises access network node functionality such as transfer of user data, mobility control, radio access network sharing, positioning, session management etc., except those functions allocated exclusively to the DU. In some examples, the DU is a logical node comprises access network node functionality, depending on the functional split option between the CU and the DU. Its operation is controlled by the CU. In this respect, the CU might be responsible for the encoding of RRC messages with assistance information provided by the DU. This also allows the DU to report to the CU if a downlink RRC message has been successfully delivered to the UE or not.

In further detail, the current specified CU and DU functional division and F1-AP protocol defined in 3GPP TS 38.473 entitled "NG-RAN; F1 Application Protocol (F1AP)", version 16.4.0, specify that, with respect to handling of RRC messages, the CU is the logical node that is responsible for the RRC encoding and decoding of dedicated RRC messages with information provided by DU, and hence the CU RRC 250 is configured accordingly. It is further specified that the DU is the logical node responsible for transfer of RRC signalling from the CU to the UE over the air interface and for transfer of RRC signalling received from the UE over the air interface to the CU (where it is decoded and potentially acted on), and hence the DU RRC 350 and the UE RRC 450 are configured accordingly. Whilst this specification provides a standardized way for the CU and the DU to act on RRC messages, it also comes with some inflexibility.

Hence, there is a need for an improved handling of RRC messages with respect to the CU and the DU.

SUMMARY

An object of embodiments herein is to address the above issues by providing handling of RRC messages with respect to the CU and the DU where the above issues are resolved, or at least mitigated or reduced.

According to a first aspect there is presented a method for handling layer 3 measurements of a UE. The method is performed by an access network system. The access network system comprises a CU and a DU. The method comprises configuring the UE to perform layer 3 measurements. The UE is configured to perform layer 3 measurements according to measurement IDs. A first subset of the measurement IDs is associated with the CU and a second subset of the measurement IDs is associated with the DU. The method comprises obtaining a report with a layer 3 measurement from the UE. The report has one of the measurement IDs. The method comprises performing, at the CU, an action that depends on the layer 3 measurement in the report only when the measurement ID of the report is one of the measurement IDs in the first subset. The method comprises performing, at the DU, an action that depends on the layer 3 measurement in the report only when the measurement ID of the report is one of the measurement IDs in the second subset.

According to a second aspect there is presented an access network system for handling layer 3 measurements of a UE. The access network system comprises a CU and a DU. The access network system comprises processing circuitry. The processing circuitry is configured to cause the access network system to configure the UE to perform layer 3 measurements. The UE is configured to perform layer 3 measurements according to measurement IDs. A first subset of the measurement IDs is associated with the CU and a second subset of the measurement IDs is associated with the DU. The processing circuitry is configured to cause the access network system to obtain a report with a layer 3 measurement from the UE. The report has one of the measurement IDs. The processing circuitry is configured to cause the access network system to perform, at the CU, an action that depends on the layer 3 measurement in the report only when the measurement ID of the report is one of the measurement IDs in the first subset. The processing circuitry is configured to cause the access network system to perform, at the DU, an action that depends on the layer 3 measurement in the report only when the measurement ID of the report is one of the measurement IDs in the second subset.

According to a third aspect there is presented an access network system for handling layer 3 measurements of a UE. The access network system comprises a CU and a DU. The access network system comprises a configure module configured to configure the UE to perform layer 3 measurements. The UE is configured to perform layer 3 measurements according to measurement IDs. A first subset of the measurement IDs is associated with the CU and a second subset of the measurement IDs is associated with the DU. The access network system comprises an obtain module configured to obtain a report with a layer 3 measurement from the UE. The report has one of the measurement IDs.

The access network system comprises an action module configured to perform, at the CU, an action that depends on the layer 3 measurement in the report only when the measurement ID of the report is one of the measurement IDs in the first subset. The access network system comprises an action module configured to perform, at the DU, an action that depends on the layer 3 measurement in the report only when the measurement ID of the report is one of the measurement IDs in the second subset.

According to a fourth aspect there is presented a computer program for handling layer 3 measurements of a UE, the computer program comprising computer program code which, when run on an access network system, causes the access network system to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously, these aspects provide efficient handling of RRC messages with respect to the CU and the DU.

Advantageously, these aspects allow both the CU and the DU to use the 3GPP framework for UE layer 3 measurements at the same time and still allows the DU to act closer to real-time without interfering with CU actions on layer 3 measurements reported by the UE.

Advantageously, by coordination the measurements between the CU and the DU, each of the CU and the DU has the freedom to configure layer 3 measurements for its own purposes.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

As disclosed above, there is a need for an improved handling of RRC messages with respect to the CU and the DU In this respect, the current split between CU and DU, including the F1-AP message specification, does neither allow the DU to configure RRC messages for layer 3 measurements to be performed by the UE nor allows the DU to receive and act on received layer 3 measurements from the UE. This implies that real-time handling of layer 3 measurements is not available for the DU, and especially if latency on the interface between the CU and the DU will impair access network performance.

Figure 1:
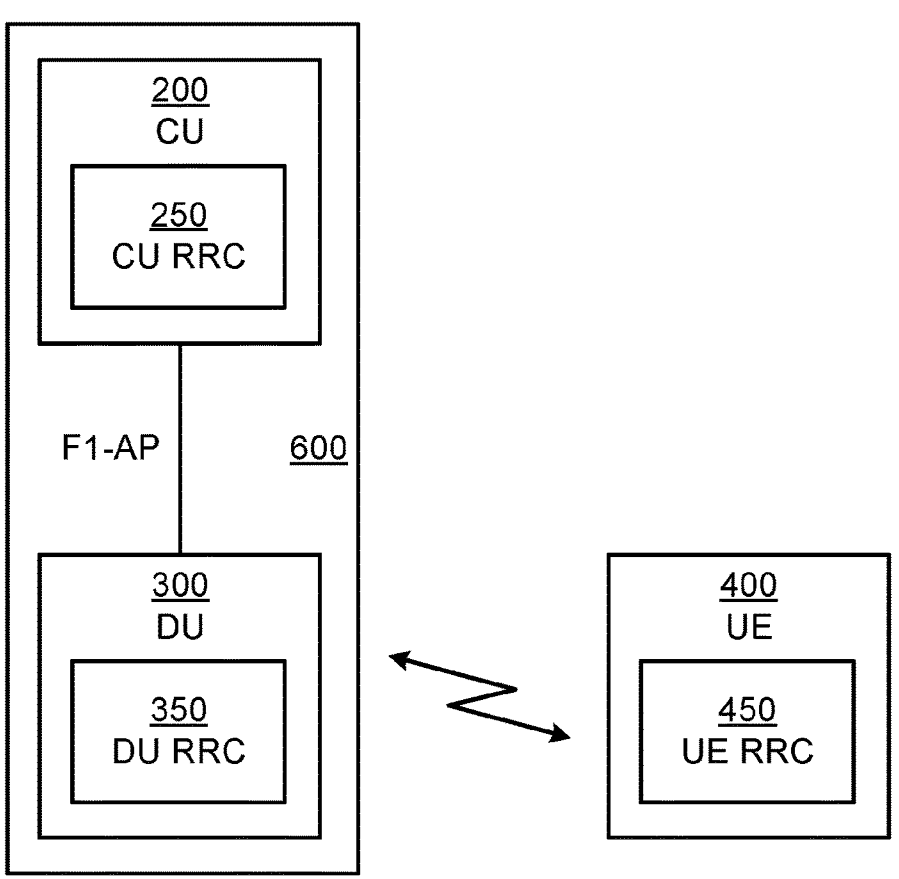
FIG. 1, FIG. 2 and FIG. 4 are schematic diagrams illustrating an access network system according to embodiments
Figure 2:
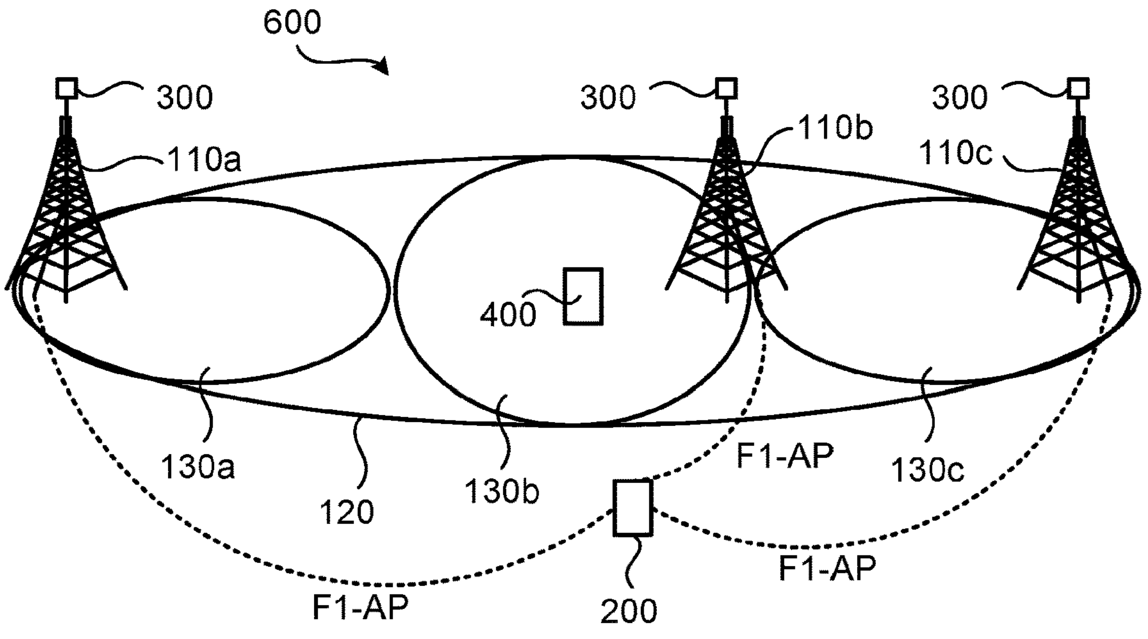

In turn, this prohibits the DU from using 3GPP specified UE event reporting for low latency real-time support of multi-TRP mobility. In this respect, a cell can consist of, or be served by, multiple TRPs, see FIG. 2. FIG. 2 schematically illustrates an access network system 600 where each TRP 110*a*, 110*b*, 110*c* is equipped with its own DU 300 and all TRPs 110*a*:110*c* are operatively connected to one and the same CU 200. Each TRP 110*a*:110*c* might represent, or be part of, an access network node. Hence, in some examples the access network system 600 comprises at least one access network node, and where the DU 300 and/or CU 200 is/are associated with this at least one access network node. The TRPs 110*a*:110*c* collectively define, or serve, a multiple-TRP cell 120. In this respect, TRP 110*a* defines, or serves, a first cell 130*a*, TRP nob defines, or serves, a second cell 130*b*, and TRP 110*c* defines, or serves, a third cell 130*c*. Usage of multiple-TRP cells 120 can be beneficial from an operator management simplicity point of view when the number of TRPs 110*a*:110*c* increase in the network e.g. indoor or stadium deployed systems, but also to enable certain performance enhancements such as diversity using joint transmission/reception, distributed mobility, seamless mobility, etc.

Further, since the UE 400 is only capable of a limited amount of layer 3 measurements, the CU 200 and the DUs 300 need to be coordinated to not configure more layer 3 measurements than what the UE 400 is capable of. Currently, there is no technology that allows both the CU 200 and the DUs 300 to use layer 3 measurements without interfering with each other in terms of maximum number of layer 3 measurements.

The embodiments disclosed herein therefore relate to mechanisms for handling layer 3 measurements of a UE 400.

In order to obtain such mechanisms there is provided an access network system 600, a method performed by the access network system 600, a computer program product comprising code, for example in the form of a computer program, that when run on an access network system 600, causes the access network system 600 to perform the method.

Figure 3:
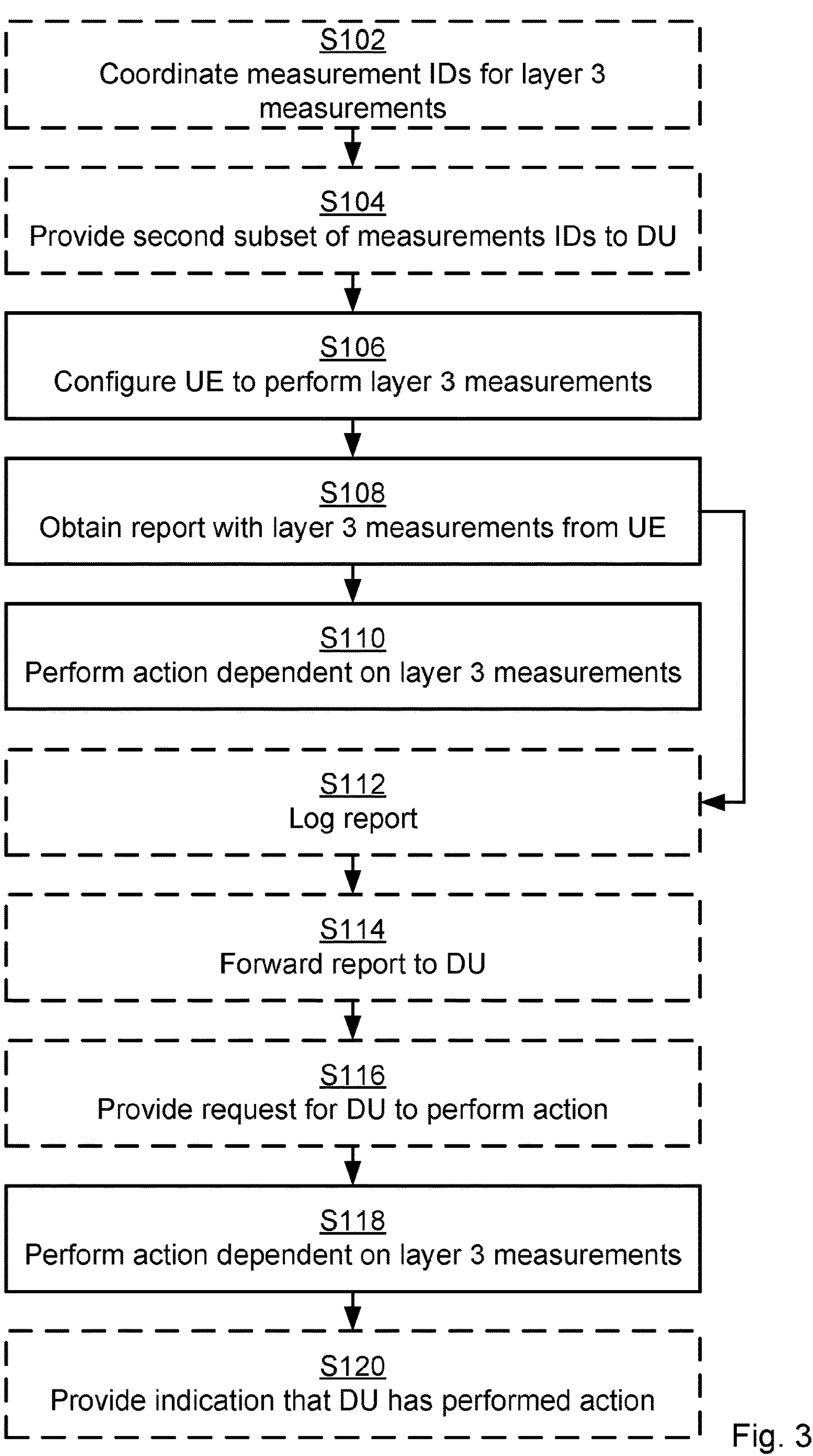
FIG. 3 is a flowchart of methods according to embodiments.

FIG. 3 is a flowchart illustrating embodiments of methods for handling layer 3 measurements of a UE 400. The methods are performed by the access network system 600. The access network system 600 comprises a CU 200 and a DU 300. The methods are advantageously provided as computer programs 820.

The access network system 600 configures the UE 400 to perform layer 3 measurements. In particular, the access network system 600 is configured to perform action S106:

S106: The access network system 600 configures the UE 400 to perform layer 3 measurements. The UE 400 is configured to perform layer 3 measurements according to measurement IDs. A first subset of the measurement IDs is associated with the CU 200 and a second subset of the measurement IDs is associated with the DU 300.

It is assumed that the access network system 600 obtains a report with a layer 3 measurement originating from the UE 400. That is, the access network system 600 is configured to perform action S108.

S108: The access network system 600 obtains a report with a layer 3 measurement from the UE 400. The report has one of the measurement IDs.

The CU 200 only takes action on its own measurement IDs. In particular, the access network system 600 is configured to perform action S110:

S110: The access network system 600, at the CU 200, performs an action that depends on the layer 3 measurement in the report only when the measurement ID of the report is one of the measurement IDs in the first subset.

The DU 300 only takes action on its own measurement IDs. In particular, the access network system 600 is configured to perform action S110:

S118: The access network system 600, at the DU 300, performs an action that depends on the layer 3 measurement in the report only when the measurement ID of the report is one of the measurement IDs in the second subset.

Embodiments relating to further details of handling layer 3 measurements of a UE 400 as performed by the access network system 600 will now be disclosed.

In some non-limiting examples, the action performed in action Sino is an initiation of a handover from a serving cell to a target cell, as indicated by the report obtained in action S108.

As disclosed above, measurement IDs are coordinated between the CU 200 and the DU 300. In some embodiments, the access network system 600 is therefore configured to perform (optional) action S102:

S102: The access network system 600 coordinates the measurement IDs for layer 3 measurements of the UE 400 between the CU 200 and the DU 300.

In some aspects, the access network system 600 sends a copy of measurement configuration related to actions to be performed by the DU 300 to the DU 300. That is, in some embodiments, the access network system 600 is therefore configured to perform (optional) action S104:

S104: The access network system 600 provides the second subset of the measurement IDs to the DU 300.

It might be that the CU 200 receives a report that is addressed to the DU 300. Aspects relating thereto will now be disclosed. In general terms, common for all these aspects is that the CU 200 does not take any action that depends on the actual layer 3 measurement in the report.

In some aspects, the CU 200 logs reports that are addressed to the DU 300. That is, in some embodiments, the access network system 600 is therefore configured to perform (optional) action S112:

S112: The access network system 600 logs, when the measurement ID of the report is one of the measurement IDs in the second subset, the report at the CU 200.

In some aspects, the CU 200 forwards reports that are addressed to the DU 300. That is, in some embodiments, the access network system 600 is therefore configured to perform (optional) action S114:

S114: The access network system 600 forwards, when the measurement ID of the report is one of the measurement IDs in the second subset, the report to the DU 300.

In some examples, the report is in action S114 forwarded to the DU 300 from the CU 200.

The DU 300 might request permission from the CU 200 for the DU 300 to take an action that depends on the layer 3 measurement in the report with the layer 3 measurement received from the UE 400. Therefore, in some embodiments, the access network system 600 is configured to perform (optional) action S116:

S116: The access network system 600 provides, when the measurement ID of the report is one of the measurement IDs in the second subset, a request to the CU 200 for the DU 300 to perform the action.

In some examples, the request is provided to the CU 200 from the DU 300.

The DU 300 might inform the CU 200 that the action has been performed. Hence, in some embodiments, the access network system 600 is configured to perform (optional) action S120:

S120: The access network system 600 provides, when the measurement ID of the report is one of the measurement IDs in the second subset, an indication to the CU 200 that the DU 300 has performed the action.

In some examples, the indication is provided to the CU 200 from the DU 300.

Three different examples encompassing at least some of the above disclosed embodiments for handling layer 3 measurements of a UE 400 will now be disclosed.

A first example is aimed at addressing real-time properties of handling the layer 3 measurements. The first example allows larger latency on the F1-AP interface than the second example.

In the access network system 600, a copy is sent to the DU 300 of the measurement IDs related to actions to be performed by the DU 300, as in action S104.

The access network system 600 configures the UE 400 to perform layer 3 measurements, as in action S106.

The UE 400 sends a report with a layer 3 measurement report. The report is received by the access network system 600. The report comprises a measurement ID belonging to the DU 300. The DU stores a copy of the report and requests permission from the CU 200 for the DU 300 to take an action that depends on the layer 3 measurement in the report, as in action S116.

The CU 200 recognizes that the report addressed to the DU 300 and takes no action that depends on the layer 3 measurement in the report except for logging the report, as in action S112 and grants permission for the DU 300 to perform the action. The action performed by the DU 300 is delayed two times the delay on the interface between the CU 200 and the DU 300 since the DU 300 requests permission from the CU 200 to perform the action.

The DU 300 performs an action that depends on the layer 3 measurement in the report, as in action S118.

A second example is aimed at addressing real-time properties of handling the layer 3 measurements. The second example results in lower latency than in the first example.

The access network system 600 sends a copy to the DU 300 of the measurement IDs related to actions to be performed by the DU 300, as in action S104.

The access network system 600 configures the UE 400 to perform layer 3 measurements, as in action S106.

The UE 400 sends a report with a layer 3 measurement report. The report is received by the access network system 600. The report comprises a measurement ID belonging to the DU 300. The CU stores a copy of the report, as in action S112, but does not take any action that depends on the layer 3 measurement in the report. The CU 200 forwards the report to the DU 300, as in action S114.

The report is received by the DU 300. The DU 300 performs an action that depends on the layer 3 measurement in the report, as in action S120. The action performed by the DU 300 is delayed only one times the delay on the interface between the CU 200 and the DU 300 since the DU 300 does not request permission from the CU 200 to perform the action.

A third example is aimed at enabling mutual coordination between the CU 200 and the DU 300.

The access network system 600 coordinates measurement IDs for layer 3 measurements of the UE 400 between the CU 200 and the DU 300, as in action S102. A first subset of the measurement IDs is associated with the CU 200 and a second subset of the measurement IDs is associated with the DU 300.

The access network system 600 configures the UE 400 to perform layer 3 measurements, as in action S106.

The CU 200 performs an action that depends on the layer 3 measurement in the report only when the measurement ID of the report is one of the measurement IDs in the first subset, as in action Sino. The DU 300 performs an action that depends on the layer 3 measurement in the report only when the measurement ID of the report is associated with the DU 300, as in action S120. The action performed by the DU 300 is not delayed with respect to the interface between the CU 200 and the DU 300 since the DU 300 directly can perform the action on its own reports.

Figure 4:
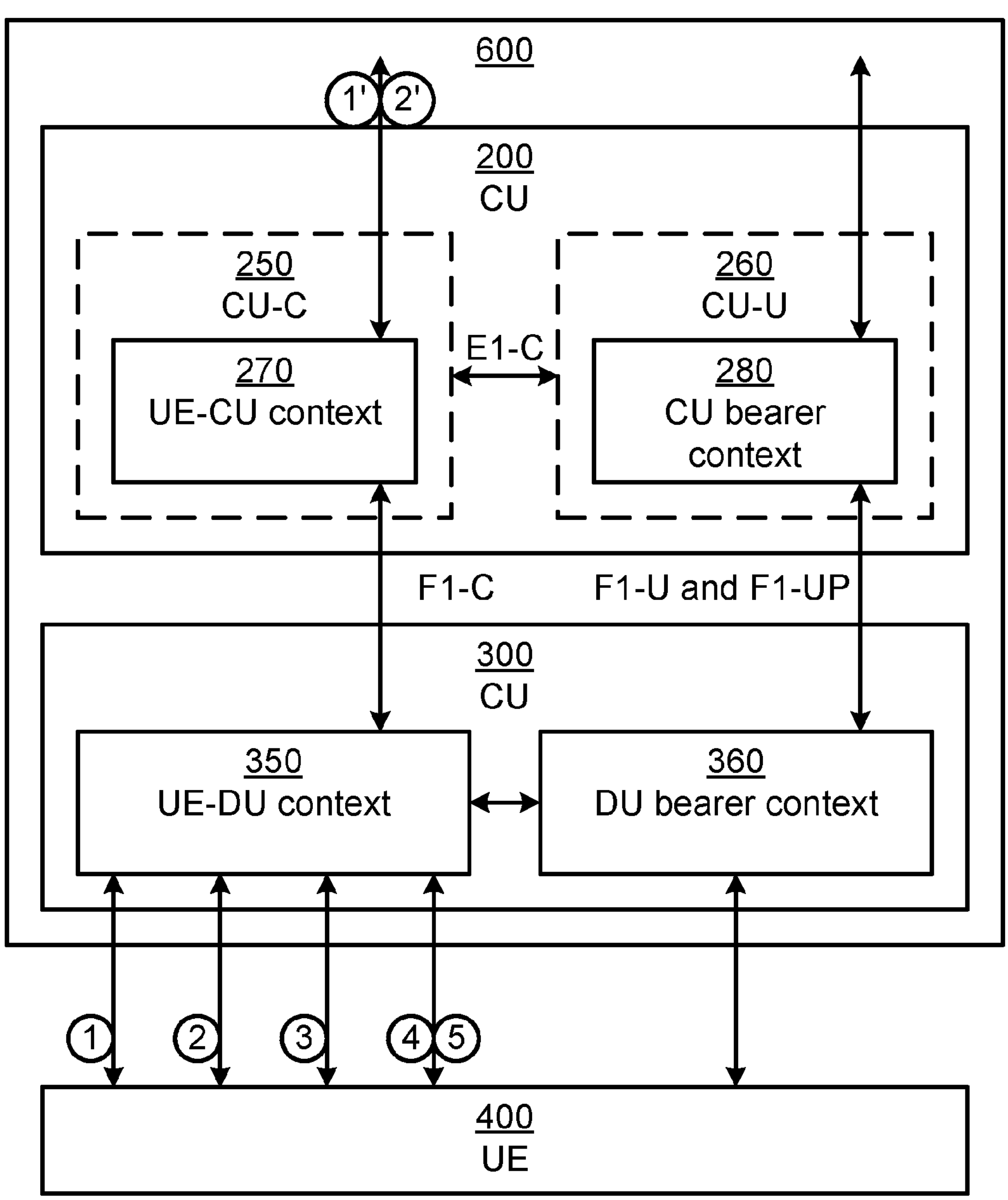

FIG. 4 schematically illustrates an access network system 600 that comprises the CU 200 and the DU 300, as well as an UE 400 and interfaces, E1-C, F1-C, F1-U and F1-UP, between these entities. The CU 200 implements a CU control (CU-C) functionality 250 in the access network system 600 and a CU user (CU-U) functionality 260 in the access network system 600. The CU-C 250 holds a UE-CU context handler 270 and the CU-U 260 holds a CU bearer context handler 280. The DU 300 holds a UE-DU context handler 350 and a DU bearer context handler 360. Encircled numbers 1, 2, 3, 4, 5, 1' and 2' represent actions. Encircled number 1 represents actions relating to RRC connection setup, encircled number 2 represents actions relating to RRC reconfiguration with measurement configuration, encircled number 3 represents actions relating to DU configured measurements, encircled number 4 represents actions relating to CU received measurement and acted upon by the DU 300, encircled number 5 represents actions relating to DU received measurement and acted upon by the DU 300, encircled number 1' and encircled number 2' represent actions relating to communication between the CU 200 and an Access and Mobility management Function (AMF) (not shown). The details of these actions will be described next with reference to FIG. 6 where the same encircled numbers appear.

Figure 5:
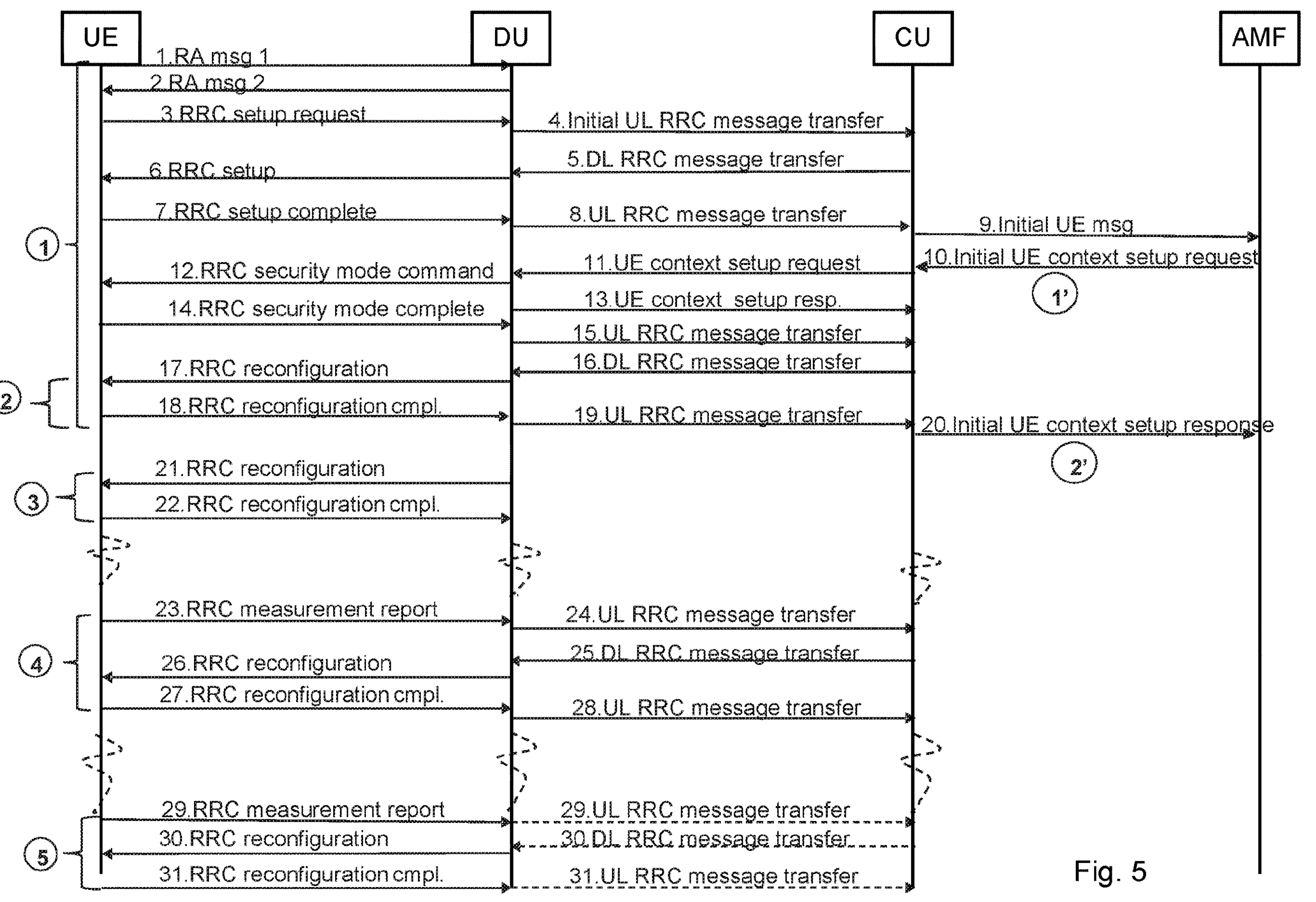
FIG. 5 is a signalling diagram according to embodiments.

One particular embodiment for handling layer 3 measurements of a UE 400 based on at least some of the above disclosed embodiments will now be disclosed in detail with reference to the signalling diagram of FIG. 5. The CU 200 and the DU 300 reside, or are comprised, in the access network system 600.

In actions 1 to 20 initial access and RRC connection setup is performed.

1. UE 400 sends a random access preamble on Layer 1 (RA msg 1).
2. DU 300 sends random access response (RA msg 2).
3. UE 400 sends an RRC Setup Request message to DU 300.
4. DU 300 includes the RRC message and, if the UE 400 is admitted, includes the corresponding low layer configuration for the UE 400 in the INITIAL UL RRC MESSAGE TRANSFER message and sends the message to CU 200.
5. CU 200 allocates a CU 200 UE 400 F1-AP identifier (ID) for the UE 400 and generates a RRCSetup message and sends the encapsulated RRC message in a DL RRC MESSAGE TRANSFER message to DU 300.
6. DU 300 sends the encapsulated RRC Setup message to UE 400.
7. UE 400 sends a RRC CONNECTION SETUP COMPLETE message to DU 300.
8. DU 300 encapsulates the RRC message in a UL RRC MESSAGE TRANSFER message and sends it to the CU 200.
9. CU 200 sends an INITIAL UE 400 MESSAGE message to the AMF 500.
10. AMF 500 sends an INITIAL CONTEXT SETUP REQUEST message to CU 200.
11. CU 200 sends a UE CONTEXT SETUP REQUEST message to establish the UE context in DU 300. This message may also encapsulate a Security Mode Command message to be sent to UE 400.
12. DU 300 sends a Security Mode Command message to the UE 400.
13. DU 300 sends a UE 400 CONTEXT SETUP RESPONSE message to CU 200.
14. UE 400 sends a Security Mode Complete message to DU 300.
15. DU 300 encapsulates the RRC message in a UL RRC MESSAGE TRANSFER message and sends it to CU 200.
16. CU 200 coordinates the message IDs and generates a RRC Reconfiguration message and encapsulates it in a DL RRC MESSAGE TRANSFER message and sends it to DU 300. Example: Assume that the MeasurementIDs have the Integer range 1 to K. One way of coordination is for the CU 200 is to start from MeasurementID 1 and allocate measurementIDs upwards for CU controlled measurements and allocate MeasurementID from K and downwards for DU controlled UE measurements.
17. DU 300 stores the measurement configuration with measurement IDs allocated for DU 300 and sends a RRCReconfiguration message to UE 400.
18. UE 400 sends a RRCReconfigurationComplete message to DU 300.
19. DU 300 encapsulates the RRC message in a UL RRC MESSAGE TRANSFER message and sends it to CU 200.

20. CU 200 sends an INITIAL CONTEXT SETUP RESPONSE message to AMF 500.

In optional actions 21 and 22 DU 300 may send its own RRC measurement configuration to UE 400.

21. DU 300 sends a RRCReconfiguration message to the UE 400 measurement IDs allocated to DU 300 and coordinated with CU 200.
22. UE 400 sends a RRCReconfiguration Complete message to DU 300.

In actions 23 to 28 DU 300 receives a measurement report with measurement ID allocated to CU 200 and CU 200 takes action in this case by sending an RRC reconfiguration to UE 400.

23. UE 400 sends an RRC measurement report to DU 300.
24. DU 300 checks the measurement ID, recognizes it to be a CU controlled measurement ID, encapsulates the RRC message in a UL RRC MESSAGE TRANSFER message and sends it to CU 200.
25. CU 200 generates a RRCReconfiguration message and encapsulates it in a DL RRC MESSAGE TRANSFER message and sends it to DU 300.
26. DU 300 sends a RRCReconfiguration message to UE 400.
27. UE 400 sends RRCReconfigurationComplete message to the DU 300.
28. DU 300 encapsulates the RRC message in a UL RRC MESSAGE TRANSFER message and sends it to CU 200.

In actions 29 to 31 DU 300 receives a measurement report with measurement ID allocated to DU 300 and DU 300 takes an action, in this case sending an RRC reconfiguration to UE 400. This could also be a DU local action such as sending a MAC control message to UE 400 or just starting a DL transmission from another TRP or switching TRP that receives uplink transmission from UE 400.

29. UE 400 sends an RRC measurement report to DU 300.
30. DU 300 checks the measurement ID and recognizes the measurement ID to be a DU controlled measurement, takes an action if needed, and, if needed, sends a RRCReconfiguration message directly to UE 400.
31. UE 400 sends a RRCReconfigurationComplete message to DU 300.

In general, measurement coordination between the CU 200 and the DU 300 according to the herein disclosed embodiments can be performed for all scenarios where the UE 400 is configured to perform measurements and report a result of the measurements to the access network system 600. Hence. whilst an example relating to how the herein disclosed embodiments could be applied in the context of initial RRC setup, the herein disclosed embodiments can also be applied in other contexts, such as during handover, RRC resume and RRC re-establishment. Some non-limiting examples are provided next for completeness of this disclosure.

According to one example, the herein disclosed embodiments can be applied in the context of early measurements to be performed by a UE 400 when in RRC idle mode and RRC inactive/suspended mode as configured by the network. The UE 400 could be configured to report measurement results during, or directly after, the RRC connected mode setup procedure.

According to one example, the herein disclosed embodiments can be applied in the context of measurements to be performed by a UE 400 after initial access and RRC connection setup from RRC idle mode or RRC connection resume from RRC inactive/suspended mode.

According to one example, the herein disclosed embodiments can be applied in the context of measurements to be performed by a UE 400 after connecting to a new cell at handover. The measurement configuration can be signalled to the UE 400 as part of the handover signalling or directly after the change is done with separate signalling. The configuring may originate from a master network node or a secondary network node.

According to one example, the herein disclosed embodiments can be applied in the context of measurements to be performed by a UE 400 after setup/change of primary secondary cell (PSCell) or secondary cell (SCell) when dual connectivity (DC) or carrier aggregation (CA) is used. The measurement configuration can be signalled to the UE 400 as part of the setup/change signalling or directly after the change is done with separate signalling. The configuring may originate from a master network node or a secondary network node According to one example, the herein disclosed embodiments can be applied in the context of measurements to be performed by a UE 400 after RRC connection re-establishment According to one example, the herein disclosed embodiments can be applied whenever the network considers it to be relevant to change the measurement configuration at the UE 400.

In summary, at least some of the herein disclosed embodiments enable the access network system 600 to configure the UE 400 with some layer 3 measurements with high real-time requirements and to provide the DU 300 with a copy of the measurement configurations related to these layer 3 measurements. These specific layer 3 measurements are coordinated between the CU 200 and DU 300 so that the measurement ID used is known by both the CU 200 and DU 300. This allows the CU 200 to act on some reports and the DU 300 to act on other reports, without interfering with each other.

Figure 6:
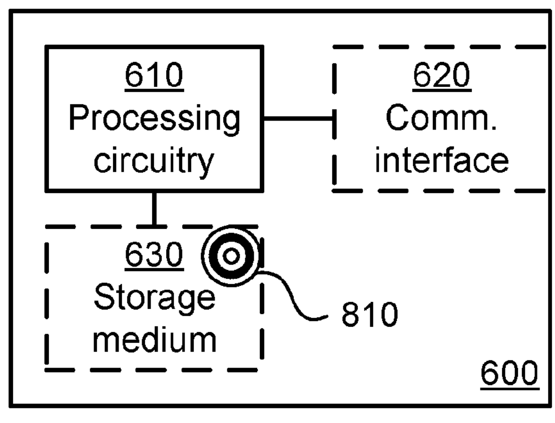
FIG. 6 is a schematic diagram showing functional units of an access network system according to an embodiment.

FIG. 6 schematically illustrates, in terms of a number of functional units, the components of an access network system 600 according to an embodiment. Processing circuitry 610 is provided using any combination of one or more of a suitable central processing unit (CPU), multiprocessor, microcontroller, digital signal processor (DSP), etc., capable of executing software instructions stored in a computer program product 810 (as in FIG. 8), e.g. in the form of a storage medium 630. The processing circuitry 610 may further be provided as at least one application specific integrated circuit (ASIC), or field programmable gate array (FPGA).

Particularly, the processing circuitry 610 is configured to cause the access network system 600 to perform a set of operations, or steps, as disclosed above. For example, the storage medium 630 may store the set of operations, and the processing circuitry 610 may be configured to retrieve the set of operations from the storage medium 630 to cause the access network system 600 to perform the set of operations. The set of operations may be provided as a set of executable instructions.

Thus the processing circuitry 610 is thereby arranged to execute methods as herein disclosed. The storage medium 630 may also comprise persistent storage, which, for example, can be any single one or combination of magnetic memory, optical memory, solid state memory or even remotely mounted memory. The access network system 600 may further comprise a communications interface 620 at least configured for communications with other entities, functions, nodes, and devices, such as one or more UEs 400.

As such the communications interface 620 may comprise one or more transmitters and receivers, comprising analogue and digital components. The processing circuitry 610 controls the general operation of the access network system 600 e.g. by sending data and control signals to the communications interface 620 and the storage medium 630, by receiving data and reports from the communications interface 620, and by retrieving data and instructions from the storage medium 630. Other components, as well as the related functionality, of the access network system 600 are omitted in order not to obscure the concepts presented herein.

Figure 7:
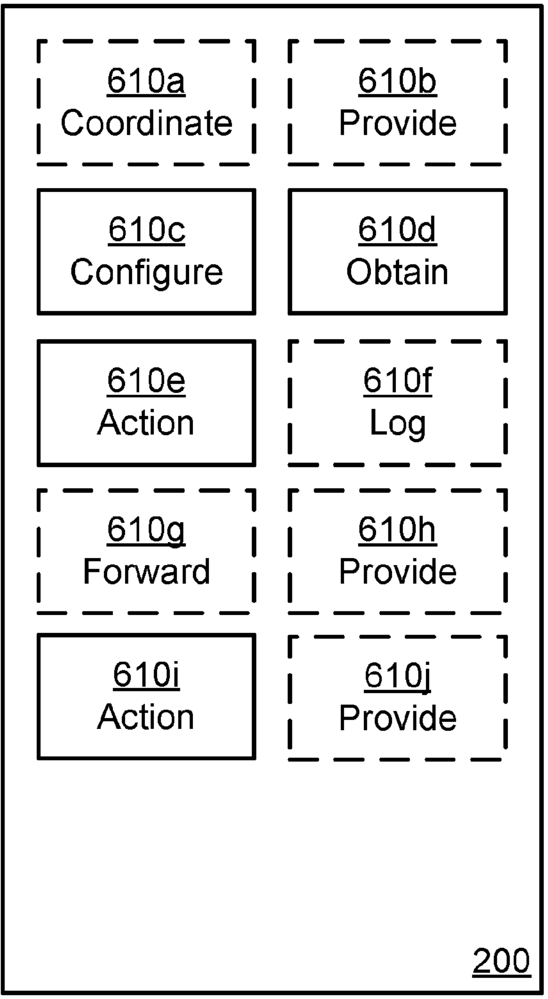
FIG. 7 is a schematic diagram showing functional modules of an access network system according to an embodiment.

FIG. 7 schematically illustrates, in terms of a number of functional modules, the components of an access network system 600 according to an embodiment. The access network system 600 of FIG. 7 comprises a number of functional modules; a configure module 610*c* configured to perform step S106, an obtain module 610*d* configured to perform step S108, a (first) action module 610*e* configured to perform step S110, and a (second) action module 610*i* configured to perform step S118. The access network system 600 of FIG. 7 may further comprise a number of optional functional modules, such as any of a coordinate module 610*a* configured to perform step S102, a (first) provide module 610*b* configured to perform step S104, a log module 61 of configured to perform step S112, a forward module 610*g* configured to perform step S114, a (second) provide module 610*h* configured to perform step S116, and a (third) provide module 610*j* configured to perform step S120.

In general terms, each functional module 610*a*:610*j* may in one embodiment be implemented only in hardware and in another embodiment with the help of software, i.e., the latter embodiment having computer program instructions stored on the storage medium 630 which when run on the processing circuitry makes the access network system 600 perform the corresponding steps mentioned above in conjunction with FIG. 7. It should also be mentioned that even though the modules correspond to parts of a computer program, they do not need to be separate modules therein, but the way in which they are implemented in software is dependent on the programming language used. Preferably, one or more or all functional modules 610*a*:610*j* may be implemented by the processing circuitry 610, possibly in cooperation with the communications interface 620 and/or the storage medium 630. The processing circuitry 610 may thus be configured to from the storage medium 630 fetch instructions as provided by a functional module 610*a*:610*j* and to execute these instructions, thereby performing any steps as disclosed herein.

The access network system 600 may be provided as a standalone device or as a part of at least one further device. Thus, a first portion of the instructions performed by the access network system 600 may be executed in a first device, and a second portion of the of the instructions performed by the access network system 600 may be executed in a second device; the herein disclosed embodiments are not limited to any particular number of devices on which the instructions performed by the access network system 600 may be executed. Hence, the methods according to the herein disclosed embodiments are suitable to be performed by an access network system 600 residing in a cloud computational environment. Therefore, although a single processing circuitry 610 is illustrated in FIG. 6 the processing circuitry 610 may be distributed among a plurality of devices, or nodes. The same applies to the functional modules 610*a*:610*j* of FIG. 7 and the computer program 820 of FIG. 8.

Figure 8:
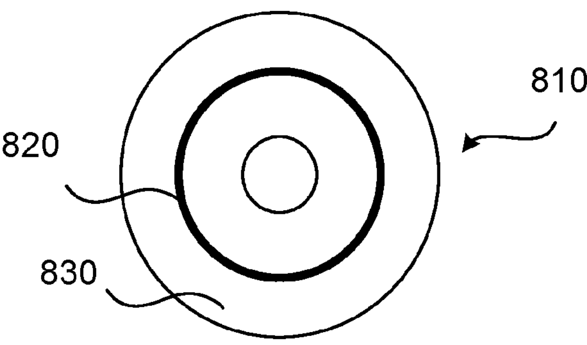
FIG. 8 shows one example of a computer program product comprising computer readable storage medium according to an embodiment.

FIG. 8 shows one example of a computer program product 810 comprising computer readable storage medium 830. On this computer readable storage medium 830, a computer program 820 can be stored, which computer program 820 can cause the processing circuitry 610 and thereto operatively coupled entities and devices, such as the communications interface 620 and the storage medium 630, to execute methods according to embodiments described herein. The computer program 820 and/or computer program product 810 may thus provide means for performing any steps as herein disclosed.

In the example of FIG. 8, the computer program product 810 is illustrated as an optical disc, such as a CD (compact disc) or a DVD (digital versatile disc) or a Blu-Ray disc. The computer program product 810 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 820 is here schematically shown as a track on the depicted optical disk, the computer program 820 can be stored in any way which is suitable for the computer program product 810.

Figure 9:
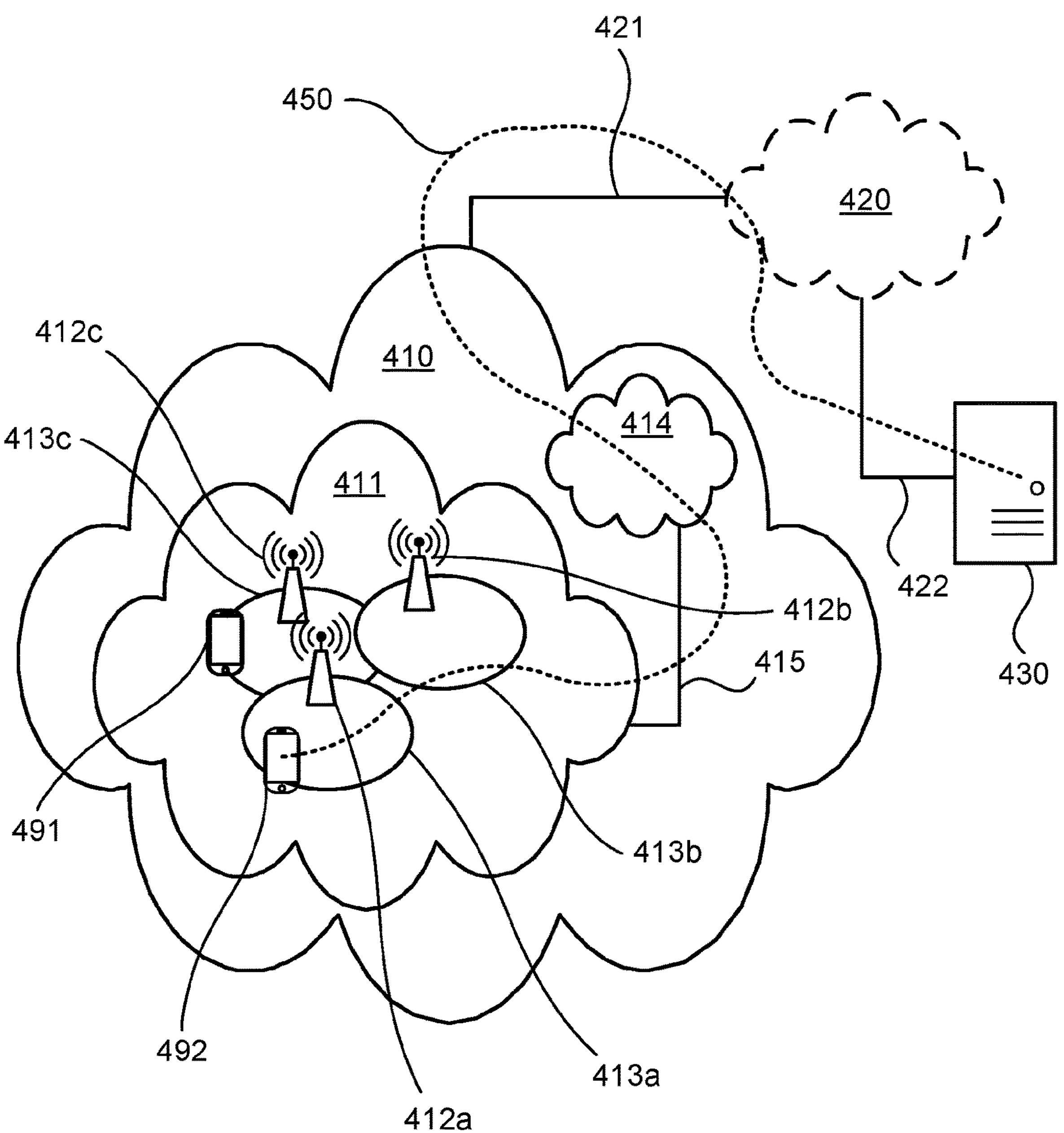
FIG. 9 is a schematic diagram illustrating a telecommunication network connected via an intermediate network to a host computer in accordance with some embodiments.

FIG. 9 is a schematic diagram illustrating a telecommunication network connected via an intermediate network 420 to a host computer 430 in accordance with some embodiments. In accordance with an embodiment, a communication system includes telecommunication network 410, such as a 3GPP-type cellular network, which comprises access network 411, and core network 414. At least access network 411 might be implemented in the access network system 600. Access network 411 comprises a plurality of radio access network nodes 412*a*, 412*b*, 412*c*, such as NBs, eNBs, gNBs (each corresponding to a respective ones of the TRPs 110*a*:110*c* of FIG. 2) or other types of wireless access points, each defining a corresponding coverage area, or cell, 413*a*, 413*b*, 413*c*. Each radio access network nodes 412*a*, 412*b*, 412*c* is connectable to core network 414 over a wired or wireless connection 415. A first UE 491 located in coverage area 413*c* is configured to wirelessly connect to, or be paged by, the corresponding network node 412*c*. A second UE 492 in coverage area 413*a* is wirelessly connectable to the corresponding network node 412*a*. While a plurality of UE 491, 492 are illustrated in this example, the disclosed embodiments are equally applicable to a situation where a sole UE is in the coverage area or where a sole terminal device is connecting to the corresponding network node 412. The UEs 491, 492 correspond to the UE 400 of FIG. 2.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 9 as a whole enables connectivity between the connected UEs 491, 492 and host computer 430. The connectivity may be described as an over-the-top (OTT) connection 450. Host computer 430 and the connected UEs 491, 492 are configured to communicate data and/or signalling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, network node 412 may not or need not be informed about the past routing of an incoming downlink communication with data originating from host computer 430 to be forwarded (e.g., handed over) to a connected UE 491. Similarly, network node 412 need not be aware of the future routing of an outgoing uplink communication originating from the UE 491 towards the host computer 430.

Figure 10:
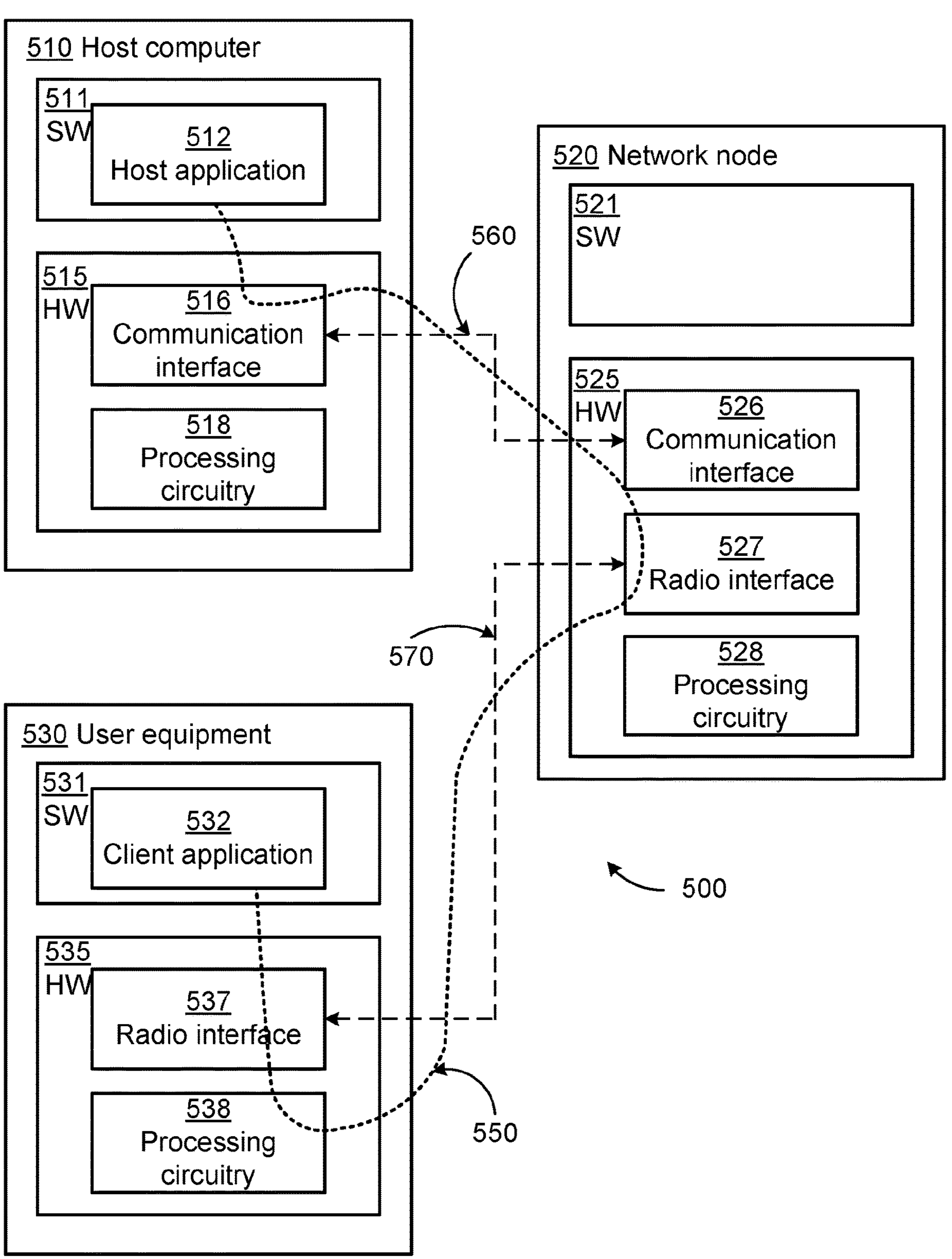
FIG. 10 is a schematic diagram illustrating host computer communicating via a radio base station with a terminal device over a partially wireless connection in accordance with some embodiments.

FIG. 10 is a schematic diagram illustrating host computer communicating via a radio access network node with a UE over a partially wireless connection in accordance with some embodiments. Example implementations, in accordance with an embodiment, of the UE, radio access network node and host computer discussed in the preceding paragraphs will now be described with reference to FIG. 10. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. The UE 530 corresponds to the UE 400 of FIG. 2. In providing the service to the remote user, host application 512 may provide user data which is transmitted using OTT connection 550.

Communication system 500 further includes radio access network node 520 provided in a telecommunication system and comprising hardware 525 enabling it to communicate with host computer 510 and with UE 530. The radio access network node 520 corresponds to the TRPs 110*a*:110*c* of FIG. 2. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 10) served by radio access network node 520. Communication interface 526 may be configured to facilitate connection 560 to host computer 510. Connection 560 may be direct or it may pass through a core network (not shown in FIG. 10) of the telecommunication system and/or through one or more intermediate networks outside the telecommunication system. In the embodiment shown, hardware 525 of radio access network node 520 further includes processing circuitry 528, which may comprise one or more programmable processors, application-specific integrated circuits, field programmable gate arrays or combinations of these (not shown) adapted to execute instructions. Radio access network node 520 further has software 521 stored internally or accessible via an external connection.

Communication system 500 further includes UE 530 already referred to. Its hardware 535 may include radio interface 537 configured to set up and maintain wireless connection 570 with a radio access network node serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, radio access network node 520 and UE 530 illustrated in FIG. 10 may be similar or identical to host computer 430, one of network nodes 412*a*, 412*b*, 412*c* and one of UEs 491, 492 of FIG. 9, respectively. This is to say, the inner workings of these entities may be as shown in FIG. 10 and independently, the surrounding network topology may be that of FIG. 9.

In FIG. 10, OTT connection 550 has been drawn abstractly to illustrate the communication between host computer 510 and UE 530 via network node 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and radio access network node 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may reduce interference, due to improved classification ability of airborne UEs which can generate significant interference.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect network node 520, and it may be unknown or imperceptible to radio access network node 520. Such procedures and functionalities may be known and practiced in the art. In certain embodiments, measurements may involve proprietary UE signalling facilitating host computer's 510 measurements of throughput, propagation times, latency and the like. The measurements may be implemented in that software 511 and 531 causes messages to be transmitted, in particular empty or 'dummy' messages, using OTT connection 550 while it monitors propagation times, errors etc.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for handling layer 3 measurements of a user equipment (UE), the method being performed by an access network system, the access network system comprising a central unit (CU) and a distributed unit (DU), the method comprising:

configuring the UE to perform layer 3 measurements, wherein the UE is configured to perform layer 3 measurements according to measurement IDs, wherein a first subset of the measurement IDs is associated with the CU and a second subset of the measurement IDs is associated with the DU;

obtaining a report with a layer 3 measurement from the UE, the report having one of the measurement IDs;

performing, at the CU, an action that depends on the layer 3 measurement in the report only when the measurement ID of the report is one of the measurement IDs in the first subset; and performing, at the DU, an action that depends on the layer 3 measurement in the report only when the measurement ID of the report is one of the measurement IDs in the second subset.

2. The method according to claim 1, wherein the method further comprises:

coordinating the measurement IDs for layer 3 measurements of the UE between the CU and the DU.

3. The method according to claim 1, wherein the method further comprises:

providing the second subset of the measurement IDs to the DU.

4. The method according to claim 1, wherein the method further comprises:

logging, when the measurement ID of the report is one of the measurement IDs in the second subset, the report at the CU.

5. The method according to claim 1, wherein the method further comprises:

forwarding, when the measurement ID of the report is one of the measurement IDs in the second subset, the report to the DU.

6. The method according to claim 5, wherein the report is forwarded to the DU from the CU.

7. The method according to claim 1, wherein the method further comprises:

providing, when the measurement ID of the report is one of the measurement IDs in the second subset, a request to the CU for the DU to perform the action at the DU that depends on the layer 3 measurement.

8. The method according to claim 7, wherein the request is provided to the CU from the DU.

9. The method according to claim 1, wherein the method further comprises:

providing, when the measurement ID of the report is one of the measurement IDs in the second subset, an indication to the CU that the DU has performed the action at the DU that depends on the layer 3 measurement.

10. The method according to claim 9, wherein the indication is provided to the CU from the DU.

11. An access network system for handling layer 3 measurements of a user equipment (UE), the access network system comprising a central unit (CU) and a distributed unit (DU), the access network system comprising processing circuitry, the processing circuitry being configured to cause the access network system to:

configure the UE to perform layer 3 measurements, wherein the UE is configured to perform layer 3 measurements according to measurement IDs, wherein a first subset of the measurement IDs is associated with the CU and a second subset of the measurement IDs is associated with the DU;

obtain a report with a layer 3 measurement from the UE, the report having one of the measurement IDs;

perform, at the CU, an action that depends on the layer 3 measurement in the report only when the measurement ID of the report is one of the measurement IDs in the first subset; and perform, at the DU, an action that depends on the layer 3 measurement in the report only when the measurement ID of the report is one of the measurement IDs in the second subset.

12. An access network system for handling layer 3 measurements of a user equipment (UE), the access network system comprising a central unit (CU) and a distributed unit (DU), the access network system comprising:

a configure module configured to configure the UE to perform layer 3 measurements, wherein the UE is configured to perform layer 3 measurements according to measurement IDs, wherein a first subset of the measurement IDs is associated with the CU and a second subset of the measurement IDs is associated with the DU;

an obtain module configured to obtain a report with a layer 3 measurement from the UE, the report having one of the measurement IDs;

an action module configured to perform, at the CU, an action that depends on the layer 3 measurement in the report only when the measurement ID of the report is one of the measurement IDs in the first subset; and another action module configured to perform, at the DU, an action that depends on the layer 3 measurement in the report only when the measurement ID of the report is one of the measurement IDs in the second subset.

13. The access network system according to claim 11, further comprising a coordinate module configured to coordinate the measurement IDs for layer 3 measurements of the UE between the CU and the DU.

14. A non-transitory computer readable storage medium comprising a computer program for handling layer 3 measurements of a user equipment (UE), the computer program comprising computer code which, when run on processing circuitry of an access network system, the access network system comprising a central unit (CU) and a distributed unit (DU), causes the access network system to:

configure the UE to perform layer 3 measurements, wherein the UE is configured to perform layer 3 measurements according to measurement IDs, wherein a first subset of the measurement IDs is associated with the CU and a second subset of the measurement IDs is associated with the DU;

obtain a report with a layer 3 measurement from the UE, the report having one of the measurement IDs;

perform, at the CU, an action that depends on the layer 3 measurement in the report only when the measurement ID of the report is one of the measurement IDs in the first subset; and perform, at the DU, an action that depends on the layer 3 measurement in the report only when the measurement ID of the report is one of the measurement IDs in the second subset.

* * * * *